(12) United States Patent
Umeki

(10) Patent No.: US 7,453,287 B2
(45) Date of Patent: Nov. 18, 2008

(54) SWITCHING POWER-SUPPLY CIRCUIT AND SEMICONDUCTOR INTEGRATED CIRCUIT

(75) Inventor: Nobuaki Umeki, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 11/811,834

(22) Filed: Jun. 12, 2007

(65) Prior Publication Data

US 2007/0296386 A1     Dec. 27, 2007

(30) Foreign Application Priority Data

Jun. 12, 2006   (JP)  ............................ P2006-162740
Jun. 12, 2006   (JP)  ............................ P2006-162744

(51) Int. Cl.
*H03K 19/0175*    (2006.01)
(52) U.S. Cl. ............................ 326/82; 326/33; 326/83
(58) Field of Classification Search .................. 326/33, 326/82–83; 323/282, 284
See application file for complete search history.

(56) References Cited

U.S. PATENT DOCUMENTS 6,091,234 A * 7/2000 Kitagawa .................... 323/244
7,019,507 B1 * 3/2006 Dittmer et al. .............. 323/284
2005/0264270 A1 * 12/2005 Saeki et al. ................. 323/273

FOREIGN PATENT DOCUMENTS

JP        7-67322      3/1995
JP        10-225105    8/1998

* cited by examiner

*Primary Examiner*—Anh Q Tran
(74) *Attorney, Agent, or Firm*—Cantor Colburn LLP

(57) ABSTRACT

A switching power-supply circuit generates a predetermined output voltage by controlling a first switching transistor connected to a power supply and a second switching transistor connected between the first switching transistor and the ground. The switching power supply circuit includes a first driver, a second driver, a soft-start voltage generator and an error amplifier. The first driver drives the first switching transistor. The second driver drives the second switching transistor. The soft-start voltage generator generates a soft-start voltage that increases gradually after the time of start. The error amplifier amplifies an error voltage between a feedback voltage based on the predetermined output voltage and the soft-start voltage, and controls the first and second drivers in accordance with an amplified error voltage.

13 Claims, 11 Drawing Sheets

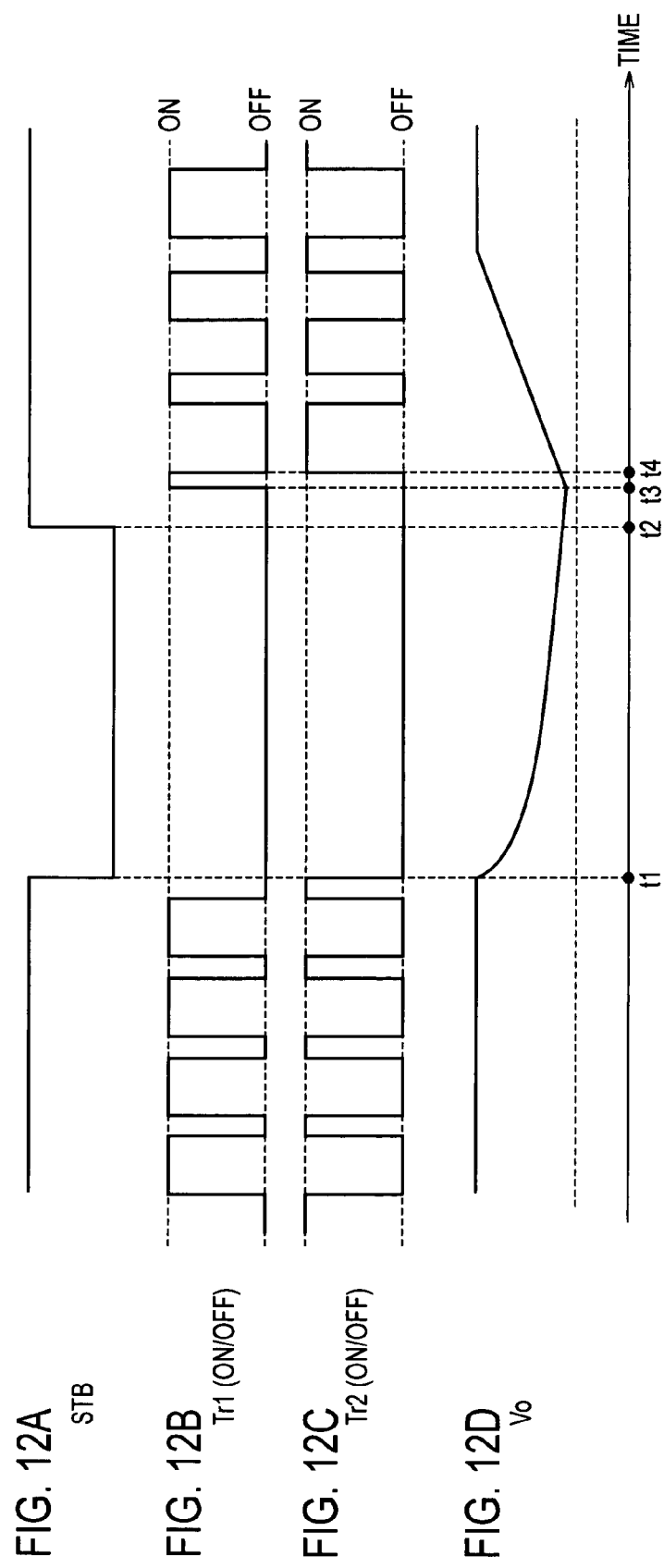

SWITCHING POWER-SUPPLY CIRCUIT AND SEMICONDUCTOR INTEGRATED CIRCUIT

CROSS REFERENCE TO RELATED APPLICATIONS

This application is based upon and claims the benefit of priority from prior Japanese Patent Application P2006-162740 filed on Jun. 12, 2006, and Japanese Patent Application P2006-162744 filed on Jun. 12, 2006; the entire contents of which are incorporated by reference herein.

BACKGROUND OF THE INVENTION

1. Field of the Invention

The present invention relates to a switching power-supply circuit and a semiconductor integrated circuit that generate a predetermined output voltage by controlling a first switching transistor connected to a power supply and a second switching transistor connected between the first switching transistor and the ground.

2. Description of the Related Art

As a power-supply circuit that efficiently converts an input voltage into a given output voltage, a power-supply circuit of a switching regulator type is known. Also used is a power-supply circuit having plural channels through which the power-supply circuit is capable of supplying different output voltages respectively to plural loads. In the switching regulator, further, a soft-start operation takes place for the purpose of suppressing an inrush current passing through a switching element at the time of start. As employed herein, the "soft-start operation" refers to the operation of, after the start, gradually increasing a conducting (or on-duty) period of the switching element in order to gradually raise the output voltage.

The schematic configuration of the power-supply circuit mentioned above is illustrated in FIG. 1. A semiconductor integrated circuit 100, in FIG. 1, includes switching controllers 101 and 102 mounted thereon. The switching controller 101 controls the switching of switching transistors Tr1a and Tr2a, and the switching controller 102 controls the switching of switching transistors Tr1b and Tr2b.

The switching controllers 101 and 102 switch rapidly the switching transistors Tr1a and Tr2a, and the switching transistors Tr1b and Tr2b, respectively, to convert a power-supply voltage Vcc from a power supply into pulses. The pulses are smoothed into constant output voltages Vo1 and Vo2 by smoothing circuits 201 and 202, respectively. Detectors 311 and 312 detect the output voltages Vo1 and Vo2, respectively, and then output the detected voltages as feedback voltages Vinv1 and Vinv2, respectively.

To carry out the soft-start operation, the power-supply circuit shown in FIG. 1 also includes constant-current sources 131 and 132, and external capacitors C1a and C1b connected respectively to soft-start terminals 303a and 303b. The capacitors C1a and C1b are charged with a constant current I supplied by the constant-current sources 131 and 132, respectively, to generate soft-start voltages Vsof1 and Vsof2, respectively.

During a given period of time after the start, the switching controllers 101 and 102 perform switching control so that the feedback voltages Vinv1 and Vinv2 coincide with the soft-start voltages Vsof1 and Vsof2, respectively. As a result, the output voltages Vo1 and Vo2 can be raised gradually.

Decreasing either the soft-start voltage Vsof1 or Vsof2 to the ground voltage (i.e., 0 V) makes it possible to turn off either the output voltage Vo1 or Vo2, which will be hereinafter referred to as "independent turn-off." For carrying out the independent turn-off, a controller 103 brings either a switch SW1 or SW2 into conduction to discharge either the capacitor C1a or C1b, in accordance with an independent turn-off control signal CTL inputted to a terminal 301. Incidentally, a terminal 300 is the terminal supplied with an input of a start signal for starting the semiconductor integrated circuit 100.

For the purpose of discharging a capacitor for soft start, in the case of restarting after the stop of the supply of an output voltage, proposed is the approach of connecting a switching element across the capacitor for soft start (e.g., Japanese Patent Application Publication No. H7-67322).

For achieving the independent turn-off, the power-supply circuit shown in FIG. 1, however, requires the terminal 301 supplied with an input of the independent turn-off control signal CTL and the switches SW1 and SW2, resulting in increases in the number of terminals and the scale of circuitry.

Connecting the switching element across the capacitor for soft start makes it possible to avoid the increases in the number of terminals and the scale of circuitry. Due to the parasitic resistance of the switching element, the soft-start voltage, however, cannot be reliably decreased to 0 V and floats on the order of 10 mV above the ground voltage (0 V). It is therefore difficult to completely turn off the output voltage.

SUMMARY OF THE INVENTION

The present invention has been made in consideration for the foregoing problems inherent in the related art. An object of the present invention is to provide a starting circuit and a semiconductor integrated circuit, which are capable of achieving soft-start operation without increasing the number of terminals and the scale of circuitry, and which are also capable of turning off an output voltage with reliability.

In order to achieve the above object, a first feature of the present invention provides a switching power-supply circuit that generates a predetermined output voltage by controlling a first switching transistor connected to a power supply and a second switching transistor connected between the first switching transistor and the ground. A gist of the first feature is to include: a first driver configured to drive the first switching transistor; a second driver configured to drive the second switching transistor; a soft-start voltage generator configured to generate a soft-start voltage that increases gradually after the time of start; and an error amplifier configured to amplify an error voltage between a feedback voltage based on the predetermined output voltage and the soft-start voltage, and to control the first and second drivers in accordance with an amplified error voltage, wherein the error amplifier includes an offset applying circuit configured to apply an offset voltage to the soft-start voltage, and the error amplifier does not start outputting the amplified error voltage until the soft-start voltage increases to a predetermined value.

A gist of a second feature of the present invention provides the switching power-supply circuit according to the first feature of the present invention. In the switching power-supply circuit, the soft-start voltage generator includes: a capacitor configured to be charged with an electric current, and to generate the soft-start voltage; a current source configured to supply the electric current to the capacitor; and a discharge transistor configured to discharge the capacitor in accordance with an external control signal.

A gist of a third feature of the present invention provides the switching power-supply circuit according to the first feature of the present invention. In the switching power-supply circuit, the feedback signal is generated by dividing the predetermined output voltage.

A gist of a fourth feature of the present invention provides the switching power-supply circuit according to the first feature of the present invention. The switching power-supply circuit further includes: an oscillator configured to output an oscillation signal that is a signal of a predetermined frequency; and a comparator configured to compare the amplified error signal with the oscillation signal, wherein the first and second drivers are controlled by an output signal from the comparator.

A gist of a fifth feature of the present invention provides the switching power-supply circuit according to the fourth feature of the present invention. In the switching power-supply circuit, the oscillation signal is a triangular wave.

A gist of a sixth feature of the present invention provides the switching power-supply circuit according to the fourth feature of the present invention. In the switching power-supply circuit, the output signal from the comparator is a pulse width modulation signal.

A gist of a seventh feature of the present invention provides the switching power-supply circuit according to the first feature of the present invention. The switching power-supply circuit further includes a controller configured to permit, upon reception of an externally inputted signal for directing the controller to start operation, the second driver to turn on the second switching transistor after the first driver has turned on the first switching transistor at least one time.

A gist of an eighth feature of the present invention provides the switching power-supply circuit according to the first feature of the present invention. The switching power-supply circuit further includes an oscillator configured to output an oscillation signal that is a signal of a predetermined frequency; and a comparator configured to compare the amplified error signal with the oscillation signal, wherein the first and second drivers are controlled by an output signal from the comparator, and the switching power-supply circuit is connected between the comparator and the second driver.

A gist of a ninth feature of the present invention provides the switching power-supply circuit according to the eighth feature of the present invention. In the switching power-supply circuit, the second driver includes a delay circuit.

A gist of a tenth feature of the present invention provides a semiconductor integrated circuit that generates a predetermined output voltage by controlling a first switching transistor connected to a power supply and a second switching transistor connected between the first switching transistor and the ground. The semiconductor integrated circuit includes a first driver configured to drive the first switching transistor; a second driver configured to drive the second switching transistor; a soft-start voltage generator configured to generate a soft-start voltage that increases gradually after the time of start; and an error amplifier configured to amplify an error voltage between a feedback voltage based on the predetermined output voltage and the soft-start voltage, and to control the first and second drivers in accordance with an amplified error voltage, wherein the error amplifier includes an offset applying circuit that applies an offset voltage to the soft-start voltage, and the error amplifier does not start outputting the amplified error voltage until the soft-start voltage increases to a predetermined value.

A gist of an eleventh feature of the present invention provides the semiconductor integrated circuit according to the tenth feature of the present invention. The semiconductor integrated circuit further includes a controller, configured to permit, upon receipt of an externally inputted signal for directing the controller to start operation, the second driver to turn on the second switching transistor after the first driver has turned on the first switching transistor at least one time.

A gist of a twelfth feature of the present invention provides the semiconductor integrated circuit according to the tenth feature of the present invention. The semiconductor integrated circuit further includes a soft-start terminal supplied with an input of the soft-start voltage, wherein the soft-start terminal is connected to a capacitor, and the capacitor is configured to be charged with an electric current, and to generate the soft-start voltage.

A gist of a thirteenth feature of the present invention provides a switching power-supply circuit that generates a predetermined output voltage by controlling a first switching transistor connected to a power supply and a second switching transistor connected between the first switching transistor and the ground. The switching power-supply circuit includes a first driver configured to drive the first switching transistor; a second driver configured to drive the second switching transistor; and a controller, configured to permit, upon receipt of an externally inputted signal for directing the controller to start operation, the second driver to turn on the second switching transistor after the first driver has turned on the first switching transistor at least one time.

BRIEF DESCRIPTION OF THE DRAWINGS

FIGS. 12A to 12D are timing charts of assistance in explaining the operation of a controller according to the third embodiment of the present invention.

DETAILED DESCRIPTION OF THE INVENTION

Figure 1:
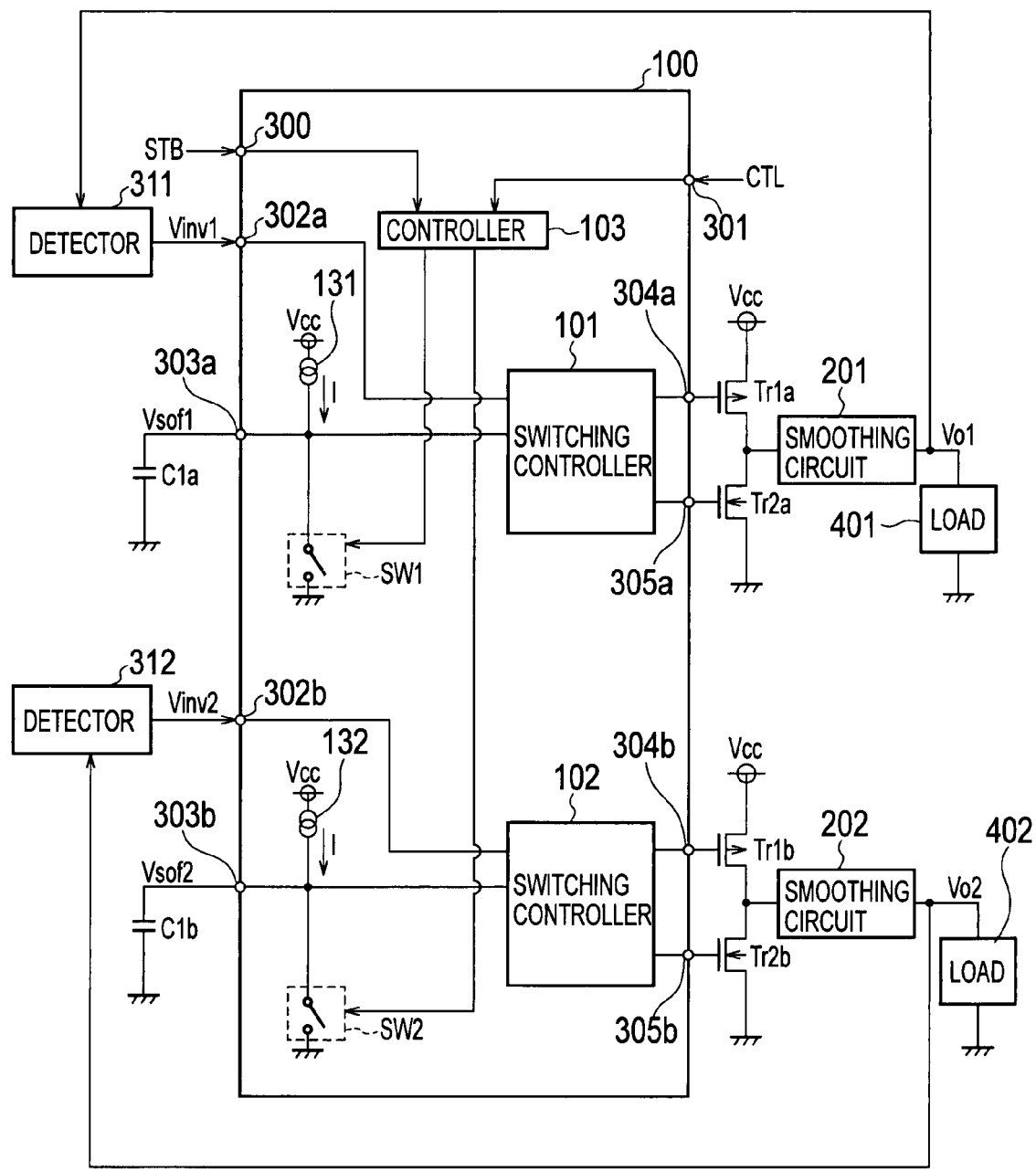
FIG. 1 is a block diagram showing an example of the configuration of a power-supply circuit according to the background art.

Various embodiments of the present invention will be described with reference to the accompanying drawings. It is to be noted that the same or similar reference numerals are applied to the same or similar parts and elements throughout the drawings, and description of the same or similar parts and elements will be omitted or simplified. In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail.

First Embodiment (The General Configuration of a Power-supply Circuit)

Figure 2:
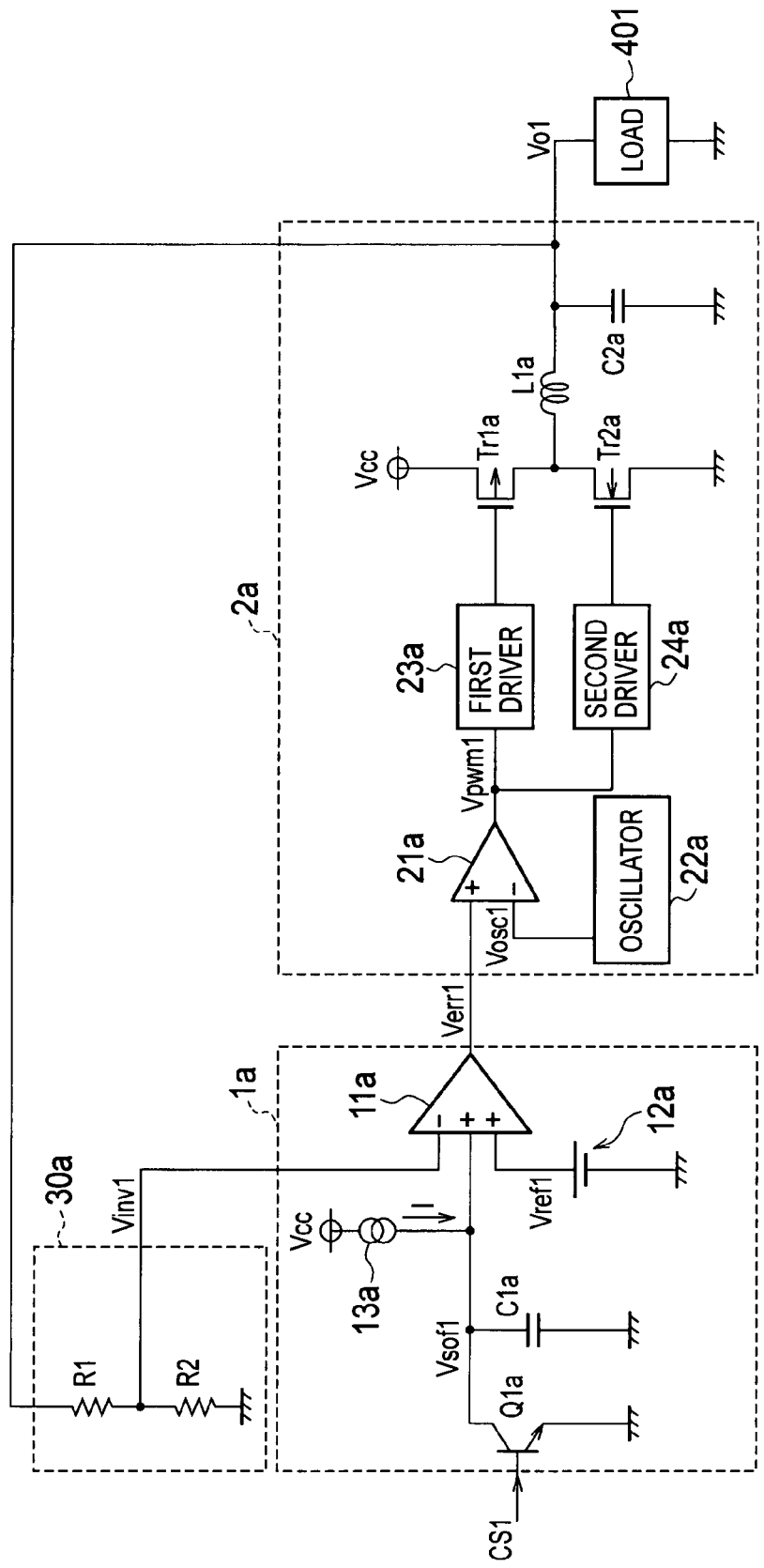
FIG. 2 is a block diagram showing an example of the configuration of a power-supply circuit according to a first embodiment of the present invention.

A power-supply circuit according to a first embodiment of the present invention, as shown in FIG. 2, includes a power-supply circuit 2a that supplies an output voltage Vo1 to a load 401, a starting circuit 1a that starts the power-supply circuit 2a, and a detector 30a that detects the output voltage Vo1 from the power-supply circuit 2a and feeds back the detected output-voltage as a feedback voltage Vinv1 into the starting circuit 1a. The starting circuit 1a includes an error amplifier 11a that amplifies an error voltage between the feedback voltage Vinv1 and a soft-start voltage Vsof1, and that outputs the amplified voltage as an error signal Verr1 to the power-supply circuit 2a in order that the feedback voltage Vinv1 coincides with the soft-start voltage Vsof1 that increases gradually after the time of start. When the soft-start voltage Vsof1 reaches a predetermined value (or an offset voltage value), the error amplifier 11a starts outputting the error signal Verr1 to start the power-supply circuit 2a.

The power-supply circuit 2a effects a change in the output voltage Vo1 in accordance with the error signal Verr1 outputted by the starting circuit 1a. Specifically, the power-supply circuit 2a turns off the output voltage Vo1 when the error signal Verr1 is 0 V, and the power-supply circuit 2a increases the output voltage Vo1 as the error signal Verr1 increases.

After the soft-start voltage Vsof1 has increased to a reference voltage Vref1, further, the starting circuit 1a amplifies an error voltage between the feedback voltage Vinv1 and the reference voltage Vref1, and outputs an error signal Verr1 to the power-supply circuit 2a in order that the feedback voltage Vinv1 coincides with the reference voltage Vref1. As a result, the output voltage Vo1 is fixed at a given value in accordance with the reference voltage Vref1. As mentioned above, the error amplifier 11a is configured to amplify the error voltage between the lower one of the voltages, the soft-start voltage Vsof1 and the reference voltage Vref1, and the feedback voltage Vinv1.

The starting circuit 1a also has the function of stopping the supply of the output voltage Vo1 to the load 401 under a control signal CS1 from a controller (not shown). When the soft-start voltage Vsof1 is equal to or lower than the reference voltage Vref1, the starting circuit 1a operates so that the feedback voltage Vinv1 coincides with the soft-start voltage Vsof1. When the soft-start voltage Vsof1 drops to the vicinity of a ground voltage, the starting circuit 1a can thus stop the supply of the output voltage Vo1 to the load 401. As mentioned above, the turn-off operation for the output voltage Vo1 and the soft-start operation are under unified control of the soft-start voltage Vsof1.

In the first embodiment of the present invention, when the control signal CS1 directs the power-supply circuit 2a to turn off the output voltage Vo1, the power-supply circuit 2a can turn off the output voltage Vo1 with reliability even if the soft-start voltage Vsof1 does not completely drop to the ground voltage (0 V), because the error amplifier 11a does not output the error signal Verr1 until the soft-start voltage Vsof1 reaches the predetermined value (or the offset voltage value).

Detailed description will now be given with regard to the configuration of the power-supply circuit 2a. The power-supply circuit 2a includes an oscillator 22a, a comparator 21a, a first driver 23a, a second driver 24a, a first switching transistor Tr1a, a second switching transistor Tr2a, a coil L1a and a smoothing capacitor C2a. A p-channel type MOS (metal oxide semiconductor) transistor (hereinafter referred to simply as a "pMOS transistor") can be used as the first switching transistor Tr1a. An n-channel type MOS transistor (hereinafter referred to simply as an "nMOS transistor") can be used as the second switching transistor Tr2a.

The first switching transistor Tr1a, the second switching transistor Tr2a, the coil L1a and the smoothing capacitor C2a constitute a step-down switching regulator. The step-down switching regulator steps down a power-supply voltage Vcc to a desired value determined by the reference voltage Vref1 to thereby produce an output voltage.

The first switching transistor Tr1a is connected, at its source, to a power supply, and is connected, at its gate, to the first driver 23a. The second switching transistor Tr2a is grounded at its source, is connected at its gate to the second driver 24a, and is connected to the first switching transistor Tr1a at their drains.

The coil L1a is connected between a connection node between the first and second switching transistors Tr1a and Tr2a and the load 401. The smoothing capacitor C2a is connected at one end to a connection node between the coil L1a and the load 401, and is grounded at the other end.

The coil L1a and the smoothing capacitor C2a constitute an LC low-pass filter to smooth a pulse occurring at the connection node between the first and second switching transistors Tr1a and Tr2a. As a result, the output voltage Vo1 is converted into a DC (direct-current) voltage.

The oscillator 22a outputs an oscillation signal (or a triangular wave) Vosc1 of a predetermined frequency in order to determine a switching period of the first and second switching transistors Tr1a and Tr2a.

The comparator 21a is connected at its noninverting input (+) to an output of the error amplifier 11a, is connected at its inverting input (−) to an output of the oscillator 22a, and is connected at its output to inputs of the first and second drivers 23a and 24a.

The comparator 21a makes a comparison between the error signal Verr1 outputted by the error amplifier 11a and the oscillation signal Vosc1 outputted by the oscillator 22a. The comparator 21a generates a pulse width modulation (PWM) signal Vpwm1, which becomes high when the error signal Verr1 is higher than the oscillation signal Vosc1 (Verr1>Vosc1) or which becomes low when the error signal Verr1 is lower than the oscillation signal Vosc1 (Verr1<Vosc1).

The first and second drivers 23a and 24a each generate a drive pulse by using the PWM signal Vpwm1 generated by the comparator 21a.

The gates of the first and second switching transistors Tr1a and Tr2a are supplied with inputs of the drive pulses outputted by the first and second drivers 23a and 24a, respectively, so that the voltage value of the output voltage Vo1 is controlled in accordance with the duty ratio of a drive pulse.

As mentioned above, a PWM scheme is used to keep the output voltage Vo1 to the load 401 at the given value. Specifically, the PWM scheme involves performing drive-pulse-based control on the "on" time ratio of the first and second switching transistors Tr1a and Tr2a, that is, the ratio of the conducting time of the first and second switching transistors Tr1a and Tr2a to an oscillation period of the oscillator 22a.

By gradually extending the period of time in which the error signal Verr1 is higher than the oscillation signal Vosc1 during a given period of time after start, the "on" time ratio becomes progressively higher. As a result, a soft-start function is achieved.

Detailed description will now be given with regard to the configurations of the detector 30a and the starting circuit 1a.

The detector 30a includes first and second resistances R1 and R2 connected in series between the connection node between the coil L1a and the load 401 and the ground. The output voltage Vo1 is divided by the first and second resistances R1 and R2 to form the feedback voltage Vinv1, which in turn is outputted. As previously mentioned, the error amplifier 11a operates so that the feedback voltage Vinv1 coincides with the reference voltage Vref1. Thus, the output voltage Vo1 is figured out by the following equation (1):

$$Vo1 = \{(R1+R2)/R2\} \times Vref1 \qquad (1)$$

where R1 and R2 denote the resistance values of the first and second resistances, respectively, and Vref1 denotes the voltage value of the reference voltage. Accordingly, the voltage value of the output voltage Vo1 is determined by the resistance values of the first and second resistances R1 and R2.

The starting circuit 1a, besides including the error amplifier 11a, includes a reference voltage generator 12a, a constant-current source 13a, a capacitor C1a and a discharge transistor Q1a. Although an npn bipolar transistor (hereinafter referred to simply as an "npn transistor") is used as the discharge transistor Q1a, other types of transistors such as an nMOS transistor may be used.

The discharge transistor Q1a is connected at its collector to a connection node between the constant-current source 13a and the capacitor C1a, is grounded at its emitter, and is connected at its base to the controller. The discharge transistor Q1a is opened or closed under the control signal CS1 from the controller.

The constant-current source 13a is connected at one end to a power supply to output a constant current I, starting at the time of start (or at turn-on). The capacitor C1a is grounded at one end, and is connected at the other end to the constant-current source 13a.

To turn on the output voltage Vo1 under the control signal CS1, the discharge transistor Q1a is turned off, and the capacitor C1a is charged with the constant current I from the constant-current source 13a. When the discharge transistor Q1a is off, the capacitor C1a generates the soft-start voltage Vsof1 that increases gradually.

The error amplifier 11a has one inverting input (−) and two noninverting inputs (+). The inverting input (−) of the error amplifier 11a is connected to a connection node between the first and second resistances R1 and R2. One of the noninverting inputs (+) of the error amplifier 11a is connected to the connection node between the constant-current source 13a and the capacitor C1a. The other noninverting input (+) of the error amplifier 1a is connected to the reference voltage generator 12a.

Hereinafter, for convenience of explanation, the inverting input (−) supplied with an input of the feedback voltage Vinv1 will be called a "feedback input," the noninverting input (+) supplied with an input of the soft-start voltage Vsof1 will be called a "soft-start input," and the noninverting input (+) supplied with an input of the reference voltage Vref1 will be called a "reference input." Here, the soft-start input of the error amplifier 11a is set to an offset in order to handle a situation where the soft-start voltage Vsof1 floats above the ground voltage (0 V) when the discharge transistor Q1a is off.

(Configuration of Error Amplifier)

Figure 3:
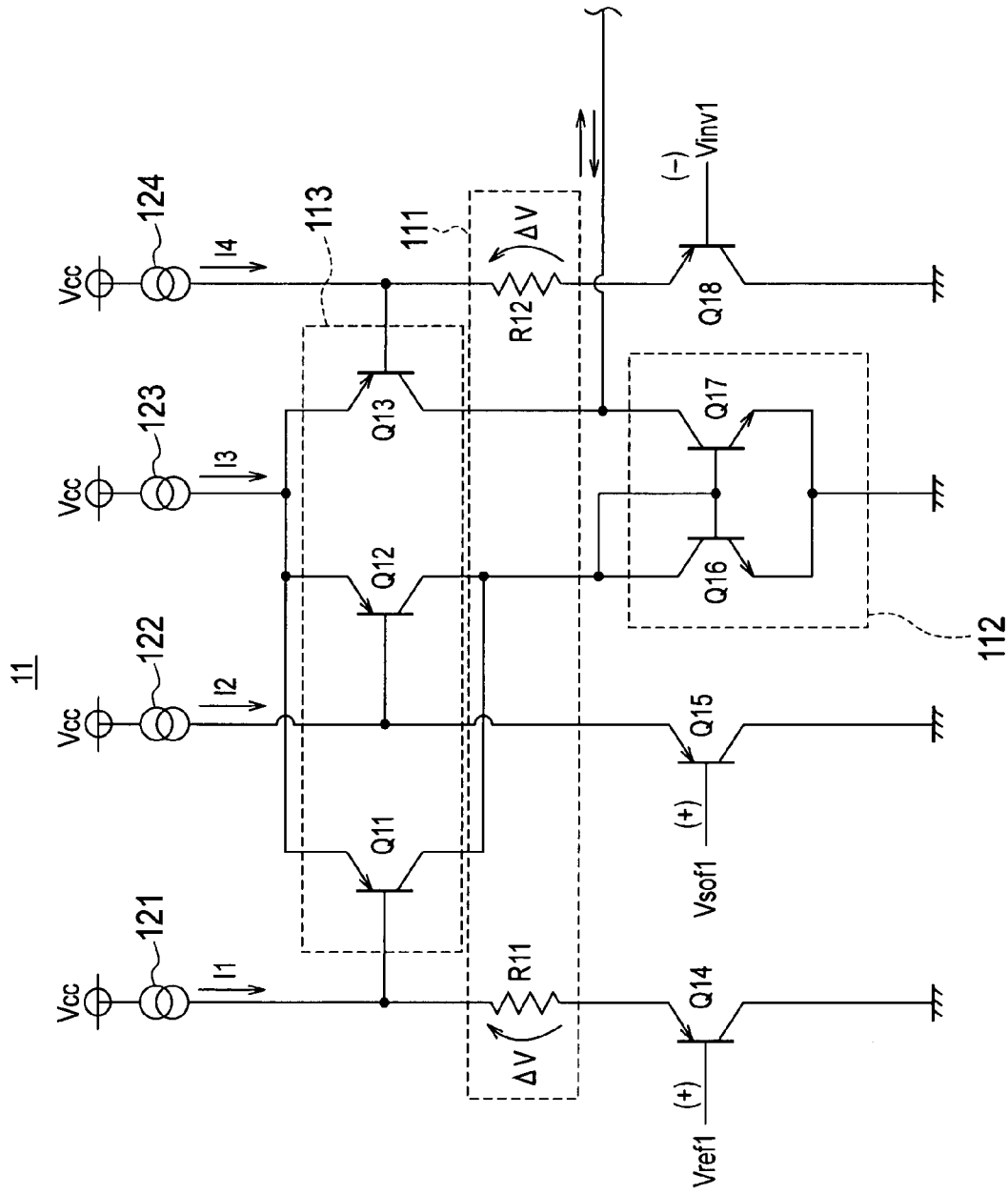
FIG. 3 is a circuit diagram showing an example of the configuration of an error amplifier according to the first embodiment of the present invention.

FIG. 3 shows an example of the circuit configuration of the input end of the error amplifier 11a. The error amplifier 11a includes constant-current sources 121, 122, 123 and 124, pnp bipolar transistors Q14, Q15 and Q18 (hereinafter each referred to simply as a "pnp transistor"), an offset circuit 111, a current mirror circuit 112 and a differential amplifier circuit 113. The differential amplifier circuit 113 includes pnp transistors Q11, Q12 and Q13. The offset circuit 111 includes resistances R11 and R12. The current mirror circuit 112 includes npn transistors Q16 and Q17.

The constant-current sources 121, 122, 123 and 124 are each connected at one end to the power supply, and output constant currents I1, I2, I3 and I4, respectively.

The pnp transistor Q14 is grounded at its collector, is connected at its emitter to one end of the resistance R11, and is connected at its base to the reference voltage generator 12a shown in FIG. 2. The base of the pnp transistor Q14 is subjected to the reference voltage Vref1, and the emitter thereof is supplied with the constant current I1 that is fed from the constant-current source 121 through the resistance R11.

The pnp transistor Q15 is grounded at its collector, is connected at its emitter to the constant-current source 122, and is connected at its base to the connection node between the constant-current source 13a and the capacitor C1a shown in FIG. 2. The base of the pnp transistor Q15 is subjected to the soft-start voltage Vsof1, and the emitter thereof is supplied with the constant current I2 from the constant-current source 122.

The pnp transistor Q18 is grounded at its collector, is connected at its emitter to the resistance R12, and is connected at its base to a connection node between the resistances R11 and R12 shown in FIG. 2. The base of the pnp transistor Q18 is subjected to the feedback voltage Vinv1, and the emitter thereof is supplied with the constant current I4 that is fed from the constant-current source 124 through the resistance R12.

The pnp transistors Q11 and Q12 of the differential amplifier circuit 113 are connected at their emitters and collectors to each other. A base of the pnp transistor Q11 is connected to a connection node between the constant-current source 121 and the resistance R11. A base of the pnp transistor Q12 is connected to a connection node between the constant-current source 122 and the emitter of the pnp transistor Q15. The base of the pnp transistor Q11 is subjected to a voltage □V defined as I1×R11 by the constant current I1 and the resistance R11. The value of the voltage □V is designed to be of the order of 0.3 V, for example.

The pnp transistor Q13 of the differential amplifier circuit 113 is connected at its emitter to the constant-current source 123 and is connected at its base to a connection node between the constant-current source 124 and the resistance R12. The base of the pnp transistor Q13 is subjected to a voltage ΔV defined as I4×R12 by the constant current I4 and the resistance R12.

The npn transistors Q16 and Q17 of the current mirror circuit 112 are connected at their bases to each other and are grounded at their emitters. The npn transistor Q16 has a collector connected to its base, and is connected at its collector to the collector of the pnp transistor Q12. The error amplifier 11a is configured to derive an output through a connection node between a collector of the npn transistor Q17 and a collector of the pnp transistor Q13.

As mentioned above, the error amplifier 11a can amplify the error voltage between the lower one of the voltages, the soft-start voltage Vsof1 and the reference voltage Vref1, and the feedback voltage Vinv1, and can set the soft-start input (+), the reference-voltage input (+) and the feedback-voltage input (−) to the offset.

(Operation of Starting Circuit)

Figure 4A:
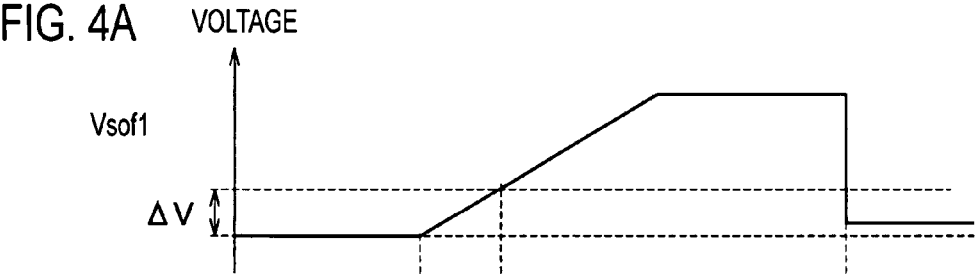
FIGS. 4A and 4B are timing charts of assistance in explaining the operation of the error amplifier according to the first embodiment of the present invention.
Figure 4B:
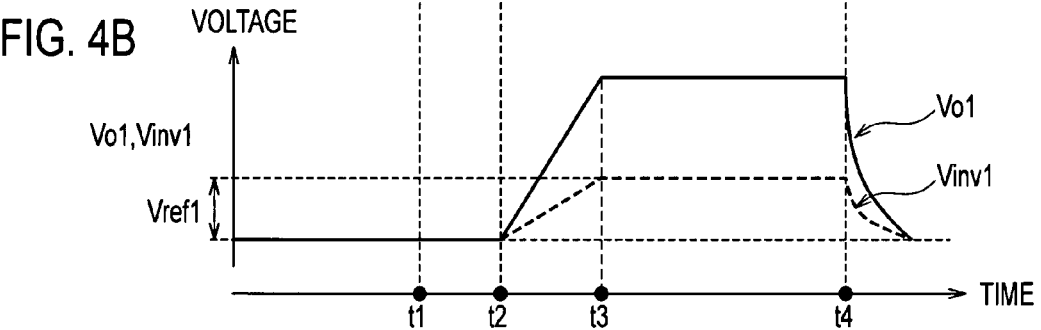

Description will now be given with regard to the operation of the starting circuit 1a shown in FIG. 2 with reference to timing charts shown in FIGS. 4A and 4B. The description will be given with regard to an instance where the discharge transistor Q1a is in its nonconducting state at time t1 and turns into its conducting state at time t4, provided that starting operation starts at the time t1 of FIGS. 4A and 4B.

At the time t1, the power-supply voltage Vcc rises, and the capacitor C1a is charged with the constant current I from the constant-current source 13a. Consequently, the soft-start voltage Vsof1 rises gradually after the time t1, as shown in FIG. 4A. As a result, a differential arises between the soft-start voltage Vsof1 and the feedback voltage Vinv1. However, the error amplifier 11a does not raises the error signal Verr1 but maintains the error signal Verr1 low, since the soft-start input of the error amplifier 11a is set to the offset.

At time t2, the soft-start voltage Vsof1 reaches the offset voltage value ΔV, and then the error amplifier 11a outputs the error signal Verr1 in accordance with the differential voltage between the soft-start voltage Vsof1 and the feedback voltage Vinv1. As a result, the power-supply circuit 2a starts, and the output voltage Vo1 rises gradually as shown in FIG. 4B. The output voltage Vo1 is converted into the feedback voltage Vinv1, which is then inputted to the feedback input (−) of the error amplifier 11a.

During a period of time between the times t2 and t3, the error amplifier 11a outputs the error signal Verr1 such that the feedback voltage Vinv1 coincides with the soft-start voltage Vsof1. Thus, the output voltage Vo1 keeps on increasing as shown in FIG. 4B.

At the time t3, the feedback voltage Vinv1 reaches the reference voltage Vref1, and then the error amplifier 11a changes an object for comparison with the feedback voltage Vinv1 from the soft-start voltage Vsof1 to the reference voltage Vref1. During a period of time between the times t3 and t4, therefore, the error amplifier 11a maintains the feedback voltage Vinv1 at the reference voltage Vref1.

At the time t4, the discharge transistor Q1a turns into its conducting state under the control signal CS1. When the discharge transistor Q1a enters its conducting state, the capacitor C1a storing electric charge is discharged, and the soft-start voltage Vsof1 falls steeply as shown in FIG. 4A. As a result, the soft-start voltage Vsof1 falls to the reference voltage Vref1 or lower. Hence, the output voltage Vo1 falls and becomes off as shown in FIG. 4B. In FIG. 4A, the soft-start voltage Vsof1 does not drop to the ground voltage. Even in such a case, however, a malfunction does not occur since the error amplifier 11a does not output the error signal Verr1 until the soft-start voltage Vsof1 reaches the offset voltage value ΔV.

Figure 5A:
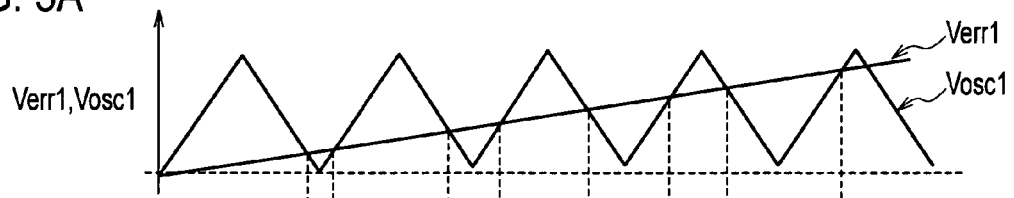
FIGS. 5A and 5B are timing charts of assistance in explaining the operation of a comparator according to the first embodiment of the present invention.
Figure 5B:
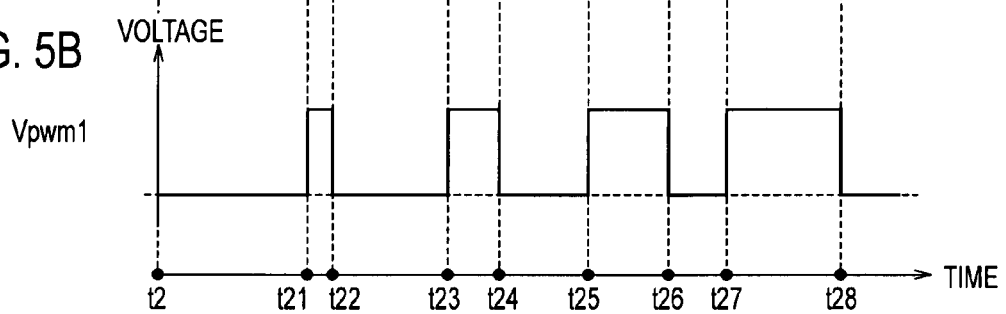

Description will now be given with regard to the operation of the comparator 21a during the period of time between the times t2 and t3 of FIGS. 4A and 4B with reference to timing charts shown in FIGS. 5A and 5B.

During a period of time before time t21, the oscillation signal Vosc1 is equal to or higher than the error signal Verr1, and the PWM signal Vpwm1 is low.

During a period of time between the times t21 and t22, the oscillation signal Vosc1 is lower than the error signal Verr1, and the PWM signal Vpwm1 is high.

Thereafter, the PWM signal Vpwm1 likewise repeats transitions between its low and high states. The duty ratio of the PWM signal Vpwm1 increases as the error signal Verr1 increases.

(Advantageous Effect)

According to the first embodiment of the present invention, as described in detail above, the error amplifier 11a starts the power-supply circuit 2a, when the soft-start voltage Vsof1 increases to the offset voltage value ΔV. Thus, the error amplifier 11a can turn off the output voltage Vo1 from the power-supply circuit 2a without starting the power-supply circuit 2a, when the soft-start voltage Vsof1 is equal to or lower than the offset voltage value ΔV. Hence, the output voltage Vo1 can be turned off with reliability even when the soft-start voltage Vsof1 does not drop sufficiently.

Second Embodiment

Figure 6:
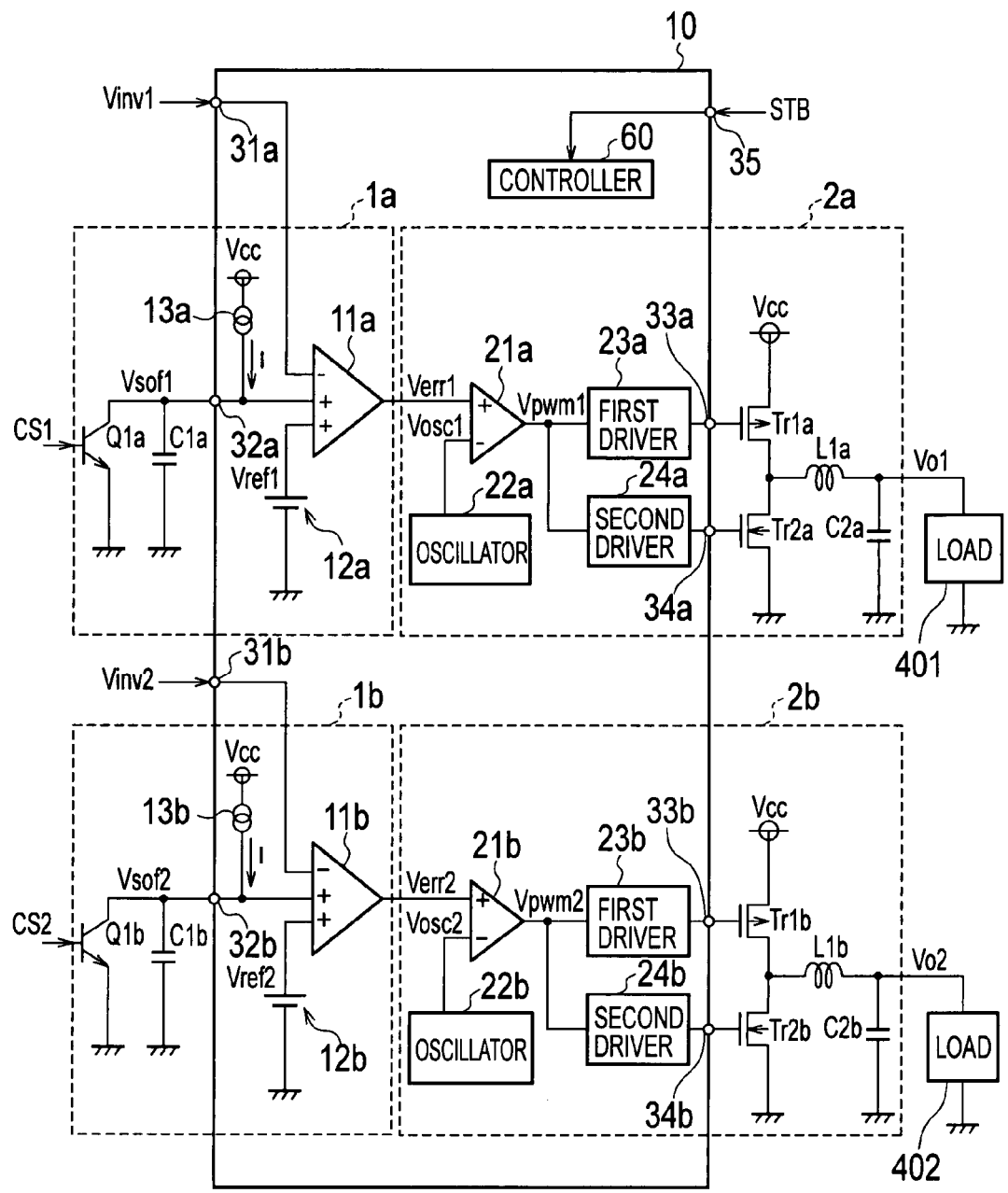
FIG. 6 is a block diagram showing an example of the configuration of a power-supply circuit according to a second embodiment of the present invention.

As for a second embodiment of the present invention, description will be given with regard to the above-described power-supply circuit as applied to a two-channel configuration as shown in FIG. 6.

(Configuration of Power-supply Circuit)

In an example shown in FIG. 6, the constant-current source 13a, the error amplifier 11a, the reference-voltage-generator 12a, the comparator 21a, the oscillator 22a, the first driver 23a and the second driver 24a, as shown in FIG. 2, are monolithically integrated on a semiconductor chip (not shown) and are coated with a molding resin (not shown) to form a semiconductor integrated circuit 10. In FIG. 6, the detector 30a shown in FIG. 2 is not shown.

The semiconductor integrated circuit 10 includes a controller 60 that starts the operation of the circuits mounted on the semiconductor integrated circuit 10 in accordance with a start signal STB. Thus, when the start signal STB directs the semiconductor integrated circuit 10 to start, the above-described soft-start operation starts.

The semiconductor integrated circuit 10 includes: feedback input terminals 31a and 31b supplied with inputs of feedback voltages Vinv1 and Vinv2, respectively; soft-start terminals 32a and 32b supplied with inputs of soft-start voltages Vsof1 and Vsof2, respectively; drive pulse output terminals 33a and 34a for outputting drive pulses from the first drivers 23a and 23b, respectively; drive pulse output terminals 33b and 34b for outputting drive pulses from the second drivers 24a and 24b, respectively; and a start signal input terminal 35 supplied with an input of the start signal STB.

As mentioned above, independent turn-off can be controlled by the soft-start voltages Vsof1 and Vsof2. This can eliminate the need for the terminal 301 for independent turn-off control shown in FIG. 1.

Since the configurations of the starting circuit 1a and the power-supply circuit 2a for the first output voltage Vo1 are the same as those of a starting circuit 1b and a power-supply circuit 2b for a second output voltage Vo2, details of the configurations of the starting circuit 1b and the power-supply circuit 2b for the second output voltage Vo2 are omitted.

(Operation of Starting Circuit)

Description will now be given with regard to the operation of the starting circuits 1a and 1b according to the second embodiment with reference to timing charts shown in FIGS. 7A to 7E. As for the same operation as the operation of the starting circuit 1a according to the first embodiment, overlapping description is omitted. Description will be given with regard to an instance where the output voltage Vo1 is independently turned off and then turned on again.

Figure 7:
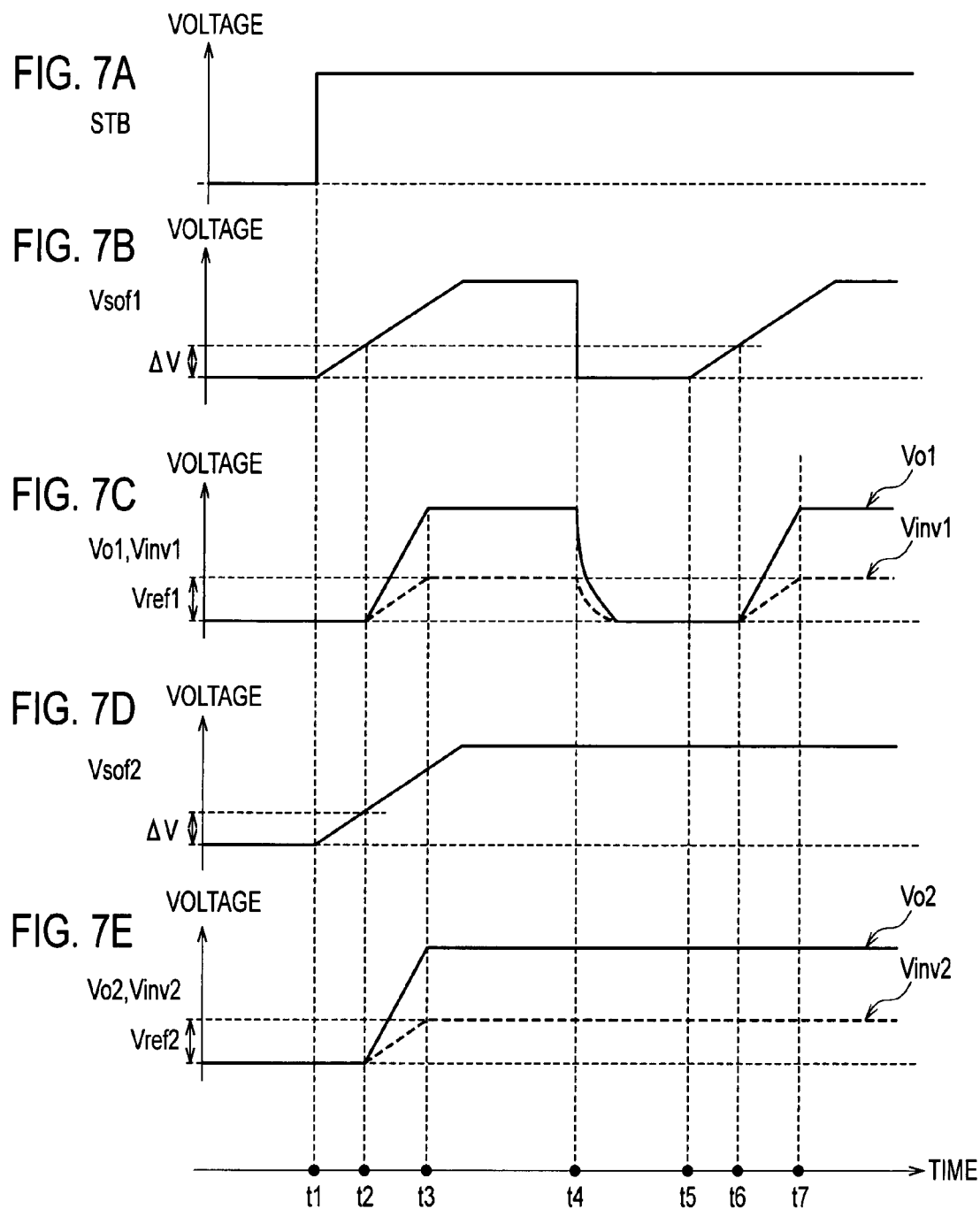
FIGS. 7A to 7E are timing charts of assistance in explaining the operation of the power-supply circuit according to the second embodiment of the present invention.

As shown in FIG. 7A, at time t1, the start signal STB makes a low to high transition, and the soft-start voltages Vsof1 and Vsof2 rise gradually.

Thereafter, at time t4, the output voltage Vo1 shown in FIG. 7C is turned off alone, and the output voltage Vo2 shown in FIG. 7E is maintained on. In this manner, the independent turn-off of the output voltage Vo1 is carried out.

When the soft-start voltage Vsof1 shown in FIG. 7B rises again at time t5, and reaches the offset voltage value ΔV at time t6, the output voltage Vo1 then rises as shown in FIG. 7C.

(Advantageous Effect)

According to the second embodiment, the external connection of the capacitors C1a and C1b makes it possible to arbitrarily select capacitance, and hence to set the time constant for the rising of the soft-start voltages Vsof1 and Vsof2. Moreover, the external connection of the resistances R1 and R2 to generate the feedback voltages Vinv1 and Vinv2 makes it possible to arbitrarily set the output voltages Vo1 and Vo2 by using the above equation (1).

Third Embodiment (Configuration of Power-supply Circuit)

Figure 8:
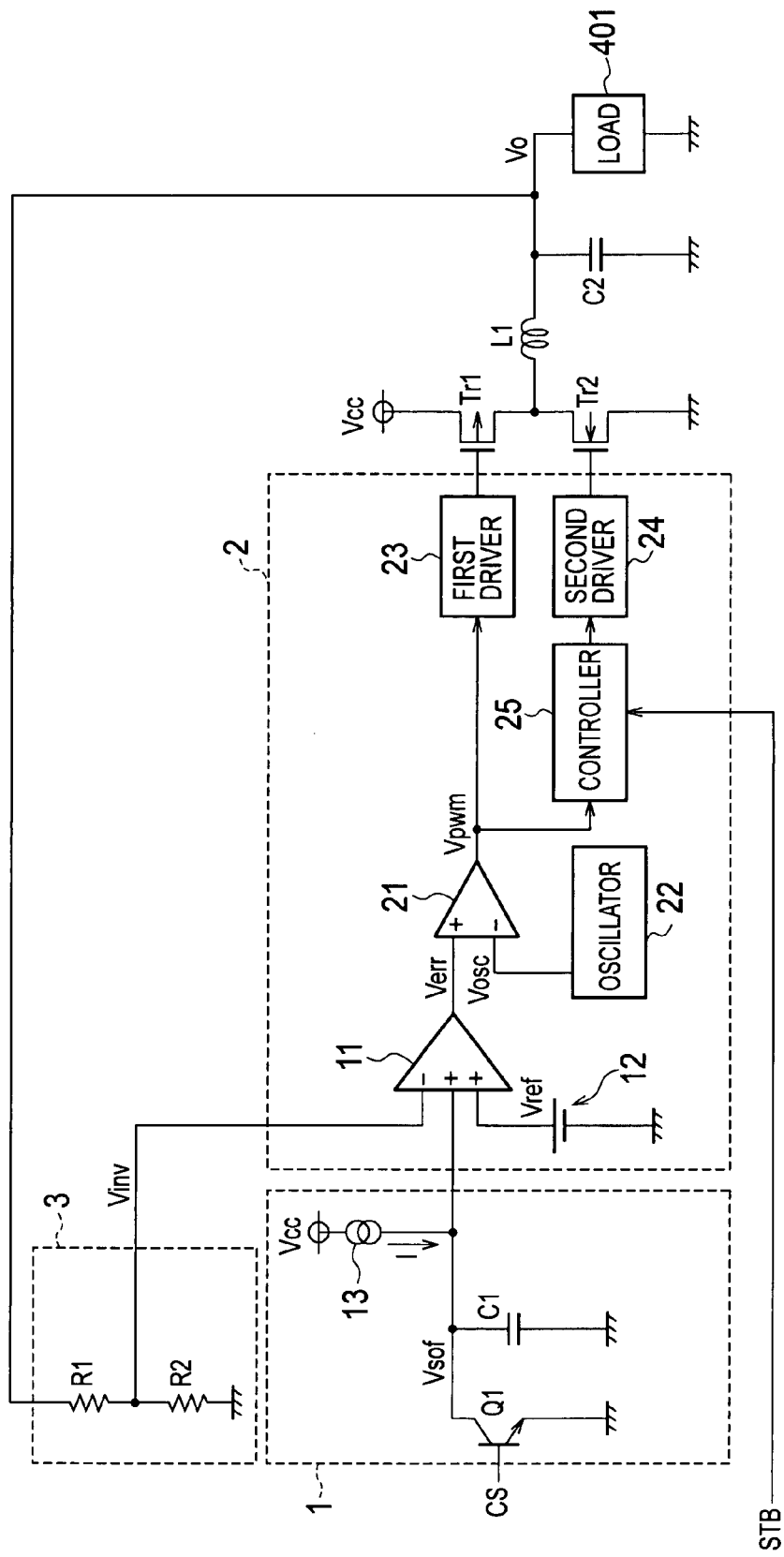
FIG. 8 is a block diagram showing an example of the configuration of a power-supply circuit according to a third embodiment of the present invention.

A power-supply circuit according to a third embodiment of the present invention, as shown in FIG. 8, includes a first switching transistor Tr1, a second switching transistor Tr2, a coil L1, a capacitor C2, a soft-start circuit 1, a switching controller 2 and a detector 3. A pMOS transistor is used as the first switching transistor Tr1. An nMOS transistor is used as the second switching transistor Tr2.

The first switching transistor Tr1, the second switching transistor Tr2, the coil L1 and the capacitor C2 constitute a step-down switching regulator. The step-down switching regulator steps down a power-supply voltage Vcc to a desired value determined by a reference voltage Vref, and outputs an output voltage Vo.

The first switching transistor Tr1 is connected to a power supply. The second switching transistor Tr2 is connected between the first switching transistor Tr1 and the ground. The coil L1 is connected between a connection node between the first and second switching transistors Trn and Tr2 and a load 401. The capacitor C2 is connected at one end to a connection node between the coil L1 and the load 401 and is grounded at the other end.

The coil L1 and the capacitor C2 constitute an LC low-pass filter to smooth a pulse occurring at the connection node between the first and second switching transistors Tr1 and Tr2. As a result, the output voltage Vo is generated.

The soft-start circuit 1 enables soft-start operation for suppressing an inrush current passing through the first and second switching transistors Tr1 and Tr2 at the time of start. Specifically, the soft-start circuit 1 includes a constant-current source 13, a capacitor C1 and a discharge transistor Q1. Although an npn bipolar transistor (hereinafter referred to simply as an "npn transistor") is used as the discharge transistor Q1, other types of transistors such as an nMOS transistor may be used.

The discharge transistor Q1 is connected at its collector to a connection node between the constant-current source 13 and the capacitor C1, is grounded at its emitter, and is connected at its base to a controller (not shown). The discharge transistor Q1 is opened or closed under a control signal CS from the controller.

The constant-current source 13 is connected at one end to a power supply to output a constant current I, starting at the time of start (or at turn-on). The capacitor C1 is grounded at one end and is connected at the other end to the constant-current source 13.

To turn on the output voltage Vo, under the control signal CS, the discharge transistor Q1 is turned off so that the capacitor C1 is charged with the constant current I from the constant-current source 13. As a result, when the discharge transistor Q1 is off, the capacitor C1 generates a soft-start voltage Vsof that increases gradually. To turn off the output voltage Vo, under the control signal CS, the discharge transistor Q1 is turned on so that the capacitor C1 is discharged.

The detector 3 detects the output voltage Vo and feeds back the detected output voltage as a feedback voltage Vinv into the switching controller 2. Specifically, the detector 3 includes first and second resistances R1 and R2 connected in series between the ground and the connection node between the coil L1 and the load 401. The output voltage Vo is divided by the first and second resistances R1 and R2 to form the feedback voltage Vinv, which in turn is outputted.

The switching controller 2 controls the switching of the first and second switching transistors Tr1 and Tr2. Specifically, the switching controller 2 includes an error amplifier 11, a reference voltage generator 12, a comparator 21, an oscillator 22, a first driver 23, a second driver 24 and a controller 25.

The error amplifier 11 has one inverting input (−) and two noninverting inputs (+). The inverting input (−) of the error amplifier 11 is connected to a connection node between the first and second resistances R1 and R2. One of the noninverting inputs (+) of the error amplifier 11 is connected to the connection node between the constant-current source 13 and the capacitor C1. The other noninverting input (+) of the error amplifier 11 is connected to the reference voltage generator 12.

The error amplifier 11 is configured to amplify an error voltage between the lower one of the voltages, the soft-start voltage Vsof and the reference voltage Vref, and the feedback voltage Vinv.

Consequently, during a period of time when the soft-start voltage Vsof is lower than the reference voltage Vref, the error amplifier 11 amplifies the error voltage between the feedback voltage Vinv and the soft-start voltage Vsof, and outputs the amplified error voltage as an error signal Verr, in order that the feedback voltage Vinv coincides with the soft-start voltage Vsof.

After the soft-start voltage Vsof has increased to the reference voltage Vref, the error amplifier 11 amplifies the error voltage between the feedback voltage Vinv and the reference voltage Vref, and outputs the amplified error voltage as an error signal Verr, in order that the feedback voltage Vinv coincides with the reference voltage Vref. As a result, the output voltage Vo is fixed at a given value in accordance with the reference voltage Vref.

As mentioned above, the error amplifier 11 operates so that the feedback voltage Vinv coincides with the reference voltage Vref. Thus, the output voltage Vo is as follows:

$$Vo = \{(R1+R2)/R2\} \times Vref \qquad (2)$$

where R1 and R2 denote the resistance values of the first and second resistances R1 and R2, respectively, of the detector 3, and Vref denotes the voltage value of the reference voltage. Hence, the voltage value of the output voltage Vo is determined by the resistance values of the first and second resistances R1 and R2.

Further, when the soft-start voltage Vsof drops to the vicinity of a ground voltage, the error amplifier 11 can stop the supply of the output voltage Vo to the load 401. As mentioned above, turn-off operation for the output voltage Vo and soft-start operation are under unified control of the soft-start voltage Vsof.

The oscillator 22 outputs an oscillation signal (or a triangular wave) Vosc of a predetermined frequency in order to determine a switching period of the first and second switching transistors Tr1 and Tr2.

The comparator 21 is connected at its noninverting input (+) to an output of the error amplifier 11 and is connected at its inverting input (−) to an output of the oscillator 22. The comparator 21 makes a comparison between the error signal Verr outputted by the error amplifier 11 and the oscillation signal Vosc outputted by the oscillator 22. The comparator 21 generates a pulse width modulation (PWM) signal Vpwm, which becomes high when the error signal Verr is higher than the oscillation signal Vosc (Verr>Vosc) or which becomes low when the error signal Verr is lower than the oscillation signal Vosc (Verr<Vosc).

As mentioned above, a PWM scheme is used to keep the output voltage Vo to the load 401 at a given value. Specifically, the PWM scheme involves performing control, based on a drive pulse, on the "on" time ratio of the first and second switching transistors Tr1 and Tr2, that is, the ratio of the conducting time of the first and second switching transistors Tr1 and Tr2 to an oscillation period of the oscillator 22.

The first driver 23 is connected between an output of the comparator 21 and a gate of the first switching transistor Tr1. The controller 25 is connected between the output of the comparator 21 and an input of the second driver 24. An output of the second driver 24 is connected to a gate of the second switching transistor Tr2.

The first and second drivers 23 and 24 output drive pulses for driving the first and second switching transistors Tr1 and Tr2, respectively. When a start signal STB is inputted externally, the controller 25 permits the second driver 24 to turn on the second switching transistor Tr2 after the first driver 23 has turned on the first switching transistor Tr1 at least one time. Incidentally, the start signal STB is, for example, the signal which gives a command to start operation when the signal makes a low to high transition, or which gives a command to stop operation when the signal makes a high to low transition.

As mentioned above, the controller 25 permits the turn-on of the second switching transistor Tr2 after the turn-on of the first switching transistor Tr1. This avoids a breakdown in the second switching transistor Tr2 by an electric current discharged from the capacitor C2 at the time of start.

(Detailed Configuration of Switching-controller)

Figure 9:
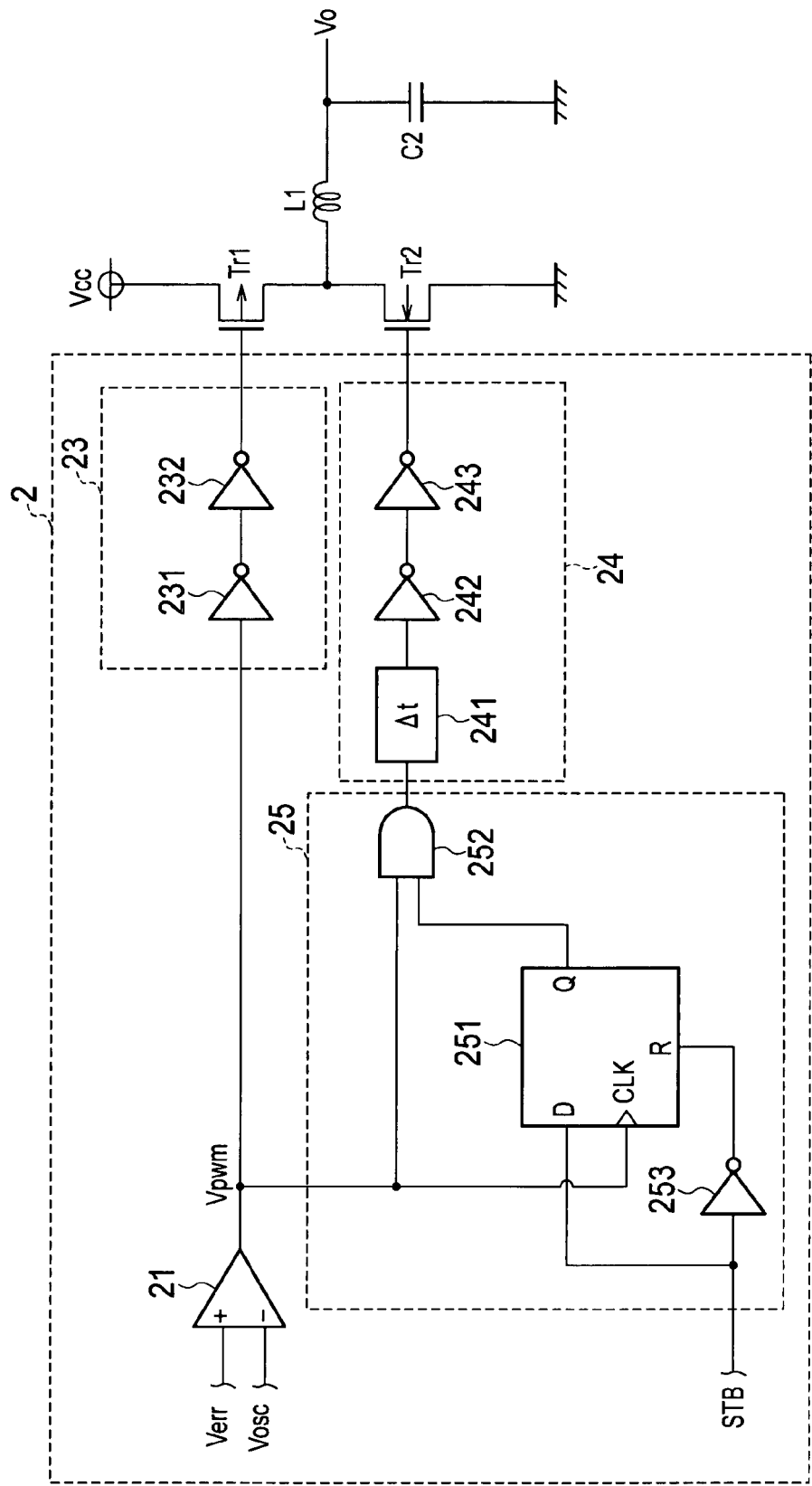
FIG. 9 is a circuit diagram showing an example of the configuration of a switching controller according to the third embodiment of the present invention.

Description will now be given with reference to FIG. 9 with regard to examples of the internal configurations of the controller 25, the first driver 23 and the second driver 24. The controller 25 includes a latch circuit 251, an AND circuit 252 and an inverter 253. The inverter 253 inverts the start signal STB. The latch circuit 251 has a data input D supplied with an input of the start signal STB, a clock input CLK supplied with an input of the PWM signal Vpwm, and a reset input R supplied with an input of the inverted start signal STB.

Thus, upon receipt of the inputs of the high start signal STB and the high PWM signal Vpwm, the latch circuit 251 outputs a high output signal from a data output Q in synchronization with the leading edge of the PWM signal Vpwm. During a "high" period of time, the latch circuit 251 keeps on outputting the high output signal. When the start signal STB falls and makes a high to low transition, the latch circuit 251 is reset to output a low output signal.

The AND circuit 252 is connected at its input to the data output Q of the latch circuit 251 and the output of the comparator 21. When the PWM signal Vpwm and the output signal from the latch circuit 251 are both high, the AND circuit 252 outputs a high signal.

The first driver 23 includes two inverters 231 and 232 connected in series. The two inverters 231 and 232 each function as a buffer circuit to subject the PWM signal Vpwm to waveform shaping.

The second driver 24 includes a delay circuit 241 and two inverters 242 and 243 connected in series. The delay circuit 241 is provided to prevent a through current from passing through the first and second switching transistors Tr1 and Tr2. The two inverters 242 and 243 each function as a buffer circuit to subject the PWM signal Vpwm to waveform shaping.

(Operation of Soft-start Circuit)

Figure 10A:
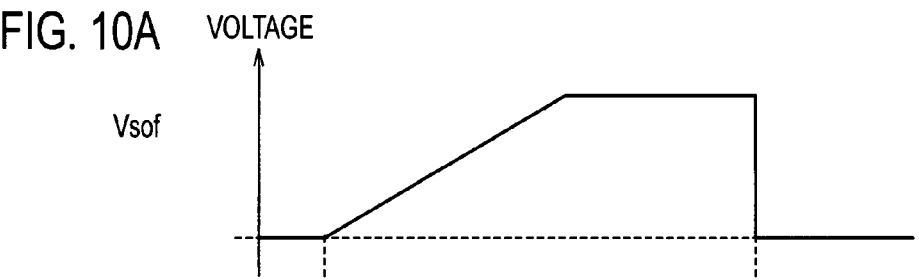
FIGS. 10A and 10B are timing charts of assistance in explaining the operation of a soft-start circuit according to the third embodiment of the present invention.
Figure 10B:
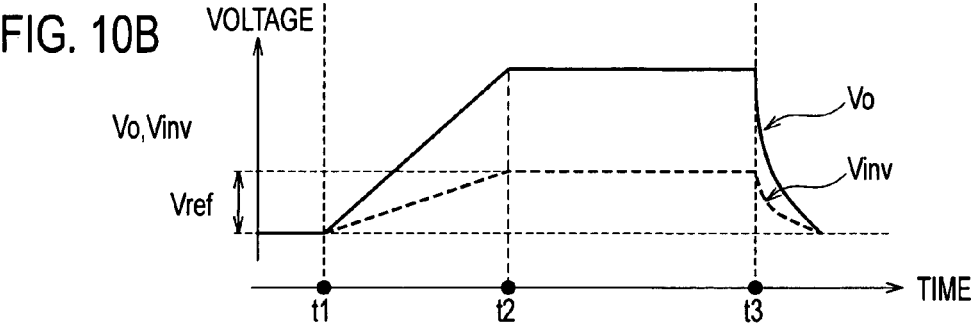

Description will now be given with regard to the operation of the soft-start circuit shown in FIG. 8 with reference to timing charts shown in FIGS. 10A and 10B. The description will be given with regard to an instance where the discharge transistor Q1 is off at time t1 and becomes on at time t3, provided that starting operation starts at the time t1 of FIGS. 10A and 10B.

At the time t1, the power-supply voltage Vcc rises, and the capacitor C1 is charged with the constant current I from the constant-current source 13. As a result, the soft-start voltage Vsof rises gradually after the time t1, as shown in FIG. 10A. The error amplifier 11 outputs the error signal Verr in accordance with the error voltage between the soft-start voltage Vsof and the feedback voltage Vinv.

At time t2, the feedback voltage Vinv reaches the reference voltage Vref, and in turn the error amplifier 11 changes an object for comparison with the feedback voltage Vinv from the soft-start voltage Vsof to the reference voltage Vref. Hence, during a period of time between the times t2 and t3, the error amplifier 11 maintains the feedback voltage Vinv at the reference voltage Vref.

At the time t3, the discharge transistor Q1 turns into its on state under the control signal CS. When the discharge transistor Q1 enters its on state, the capacitor C1 is discharged so that the soft-start voltage Vsof falls steeply as shown in FIG. 10A. As a result, the soft-start voltage Vsof falls to or below the reference voltage Vref. Accordingly, the output voltage Vo falls gradually and goes into its off state as shown in FIG. 10B.

(Operation of the Comparator)

Figure 11A:
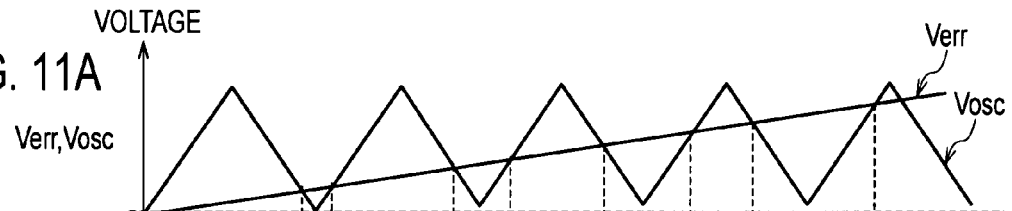
FIGS. 11A and 11B are timing charts of assistance in explaining the operation of a comparator according to the third embodiment of the present invention.
Figure 11B:
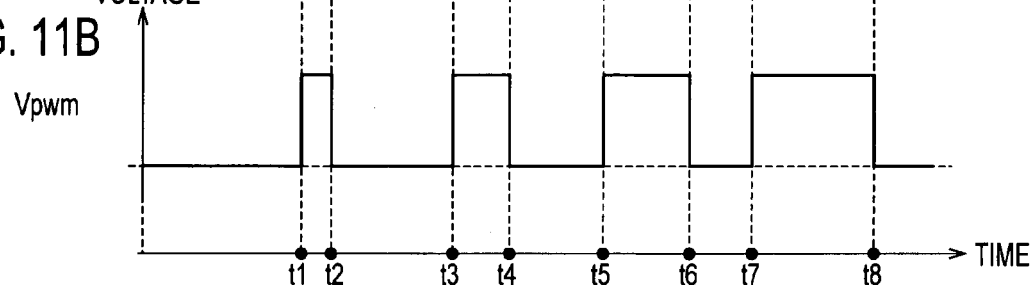

Description will now be given with reference to timing charts shown in FIGS. 11A and 11B with regard to an example of the operation of the comparator 21 during the soft-start operation.

Before and at the time t1, the oscillation signal Vosc is equal to or higher than the error signal Verr, and hence the PWM signal Vpwm is low.

During a period of time between the times t1 and t2, the error signal Verr exceeds the oscillation signal Vosc, and hence the PWM signal Vpwm becomes high.

Thereafter, the PWM signal Vpwm likewise repeats transitions between its low and high states. The duty ratio of the PWM signal Vpwm increases as the error signal Verr increases. As mentioned above, by having progressively longer periods of time where the error signal Verr is higher than the oscillation signal Vosc, the "on" time ratio becomes progressively higher. As a result, the soft-start function is implemented.

(Operation of the Controller)

Description will now be given with regard to the operation of the controller 25 with reference to timing charts shown in FIGS. 12A to 12D.

During a period of time before time t1, the start signal STB shown in FIG. 12A is high, and the first and second switching transistors Tr1 and Tr2 perform switching operation as shown in FIGS. 12B and 12C. Thus, the output voltage Vo is maintained at a given voltage value as shown in FIG. 12D.

At the time t1, the start signal STB makes a high to low transition. When the start signal STB makes the high to low transition, the first and second switching transistors Tr1 and Tr2 stop the switching operation and turn into and stay in their off states.

During a period of time between the times t1 and t2, the capacitor C2 is discharged so that the output voltage Vo falls gradually.

At the time t2, the start signal STB makes a low to high transition. When the start signal STB makes the low to high transition, the above-described soft-start operation is started, and the PWM signal Vpwm is outputted as shown in FIG. 11B.

At time t3, the PWM signal Vpwm makes a low to high transition, and the first switching transistor Tr1 is turned on. Thus, a large electric current from the capacitor C2 is absorbed by the power supply. At this point in time, the second switching transistor Tr2 is kept in its off state.

At time t4, the second switching transistor Tr2 is turned on. Thereafter, the first and second switching transistors Tr1 and Tr2 are turned on at complementary timing so that the output voltage Vo increases gradually.

(Advantageous Effect)

According to the third embodiment of the present invention, as described in detail above, for the start of the switching operation of the first and second switching transistors Tr1 and Tr2, the first switching transistor Tr1 is turned on prior to the second switching transistor Tr2. This makes it possible to prevent a large electric current from passing through the second switching transistor Tr2, and thus to avoid a breakdown in the second switching transistor Tr2. Moreover, it is possible to prevent the output voltage Vo from dropping to a negative potential, thus to prevent the generation of a lower voltage than a withstand input voltage of the load 401, and thus to prevent the occurrences of a malfunction, a deterioration and a breakdown in an internal component of the load 401.

Modification of Third Embodiment

Figure 13:
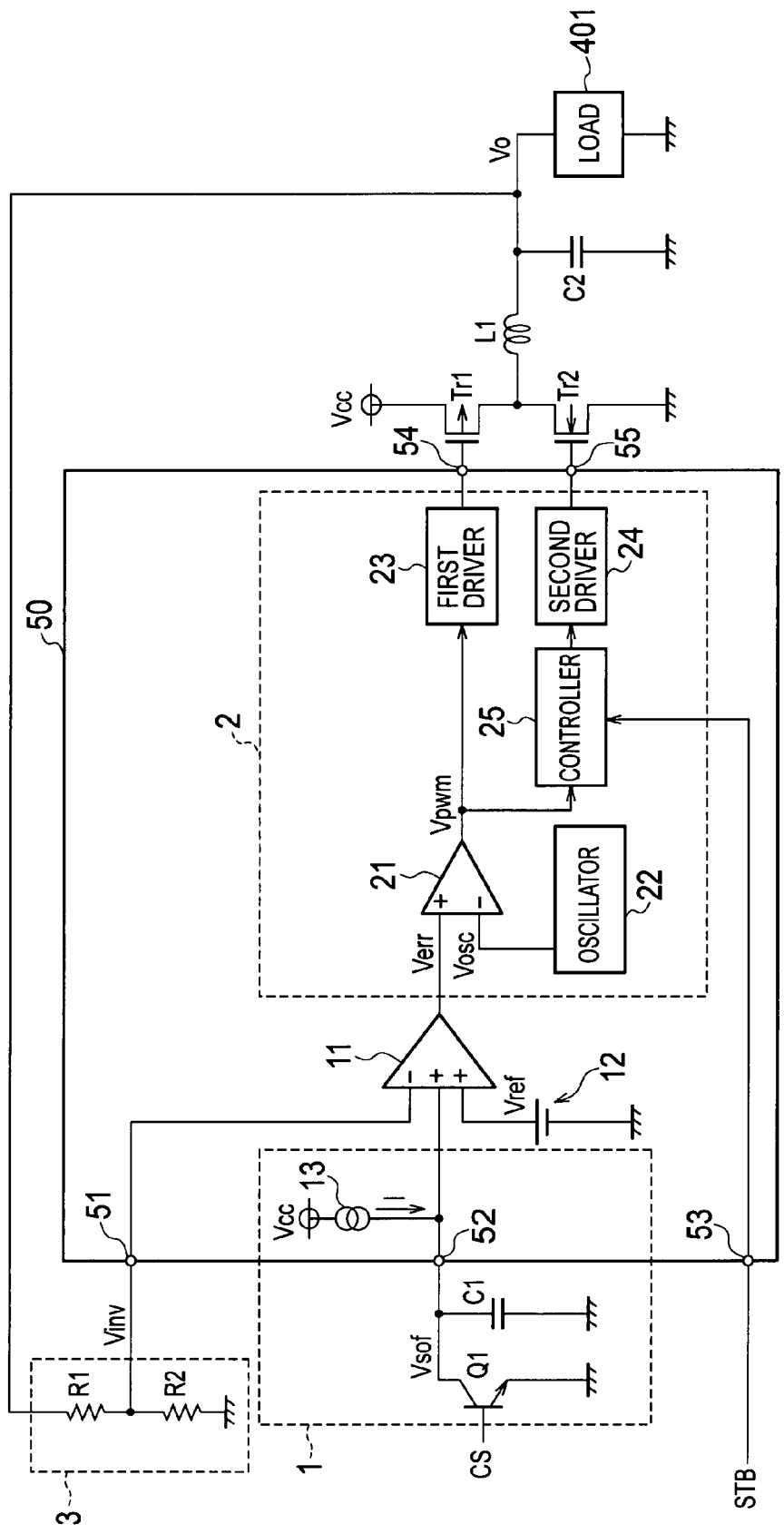
FIG. 13 is a block diagram showing an example of the configuration of a power-supply circuit according to a modification of the third embodiment of the present invention.

In a modification of the third embodiment of the present invention, as shown in FIG. 13, the constant-current source 13, the error amplifier 11, the reference voltage generator 12, the comparator 21, the oscillator 22, the first driver 23, the second driver 24 and the controller 25 are configured as a semiconductor integrated circuit 50 by being monolithically integrated on top of a semiconductor chip (not shown) and then being coated with a molding resin (not shown).

The semiconductor integrated circuit 50 includes a feedback input terminal 51 for an input of the feedback voltage Vinv, a soft-start terminal 52 for an input of the soft-start voltage Vsof, a start signal input terminal 53 for an input of the start signal STB, a drive pulse output terminal 54 for an output of a drive pulse from the first driver 23 and a drive pulse output terminal 55 for an output of a drive pulse from the second driver 24.

(Advantageous Effect)

According to the example of the modified form of the third embodiment of the present invention, the external capacitor C1 of the semiconductor integrated circuit 50 makes it possible to select any given capacitance, and hence to set the rise time constant of the soft-start voltage Vsof. Moreover, the external resistances R1 and R2 for generation of the feedback voltage Vinv make it possible to set the output voltage Vo at any given value, based on the above equation (2).

Other Embodiments

Although the present invention has been described with reference to the first, second and third embodiments, it is to be understood that the descriptions and the drawings that form part of this disclosure are not restrictive of the scope of this invention. From this disclosure, various alternative embodiments, examples and practical techniques will be apparent to those skilled in the art.

Although the description has been given with reference to the first and second embodiments with regard to an instance where the step-down switching regulators are used in the power-supply circuits 2a and 2b, a step-up switching regulator, or the like, may be used. In other words, various configurations may be employed for the power-supply circuits 2a and 2b.

Although the description has been given with reference to the second embodiment with regard to an instance where the constant-current sources 13a and 13b of the starting circuits 1a and 1b are mounted on the semiconductor integrated circuit 10, the constant-current sources 13a and 13b may be connected external to the semiconductor integrated circuit 10. Although the description has been given with reference to the second embodiment with regard to an instance where the switching transistors Tr1a, Tr2a, Tr1b and Tr2b are not mounted on the semiconductor integrated circuit 10, the switching transistors Tr1a, Tr2a, Tr1b and Tr2b may be mounted on the semiconductor integrated circuit 10.

The description has been given with reference to the third embodiment with regard to an instance where the pMOS transistor is used as the first switching transistor Tr1, and where the nMOS transistor is used as the second switching transistor Tr2. However, the pnp transistor may be used as the first switching transistor Tr1, and the npn transistor may be used as the second switching transistor Tr2.

Although the description has been given with reference to the example of the modified form of the third embodiment with regard to an instance where the constant-current source 13 of the soft-start circuit 1 is mounted on the semiconductor integrated circuit 50, the constant-current source 13 may be connected external to the semiconductor integrated circuit 50. Although the description has been given with regard to an instance where the first and second switching transistors Tr1 and Tr2 are not mounted on the semiconductor integrated circuit 50, the first and second switching transistors Tr1 and Tr2 may be mounted on the semiconductor integrated circuit 50.

It is to be understood that the present invention may include various embodiments and others not described herein. Thus, the scope of the invention is to be determined solely by the following claims.

What is claimed is:

1. A switching power-supply circuit that generates a predetermined output voltage by controlling a first switching transistor connected to a power supply and a second switching transistor connected between the first switching transistor and the ground, the switching power supply circuit comprising:
   a first driver configured to drive the first switching transistor;
   a second driver configured to drive the second switching transistor;
   a reference voltage generator configured to generate a reference voltage;
   a soft-start voltage generator configured to generate a soft-start voltage that increases gradually after the time of start; and
   an error amplifier configured to amplify an error voltage between a feedback voltage based on the predetermined output voltage and the soft-start voltage, and to control the first and second drivers in accordance with an amplified error voltage,
   wherein the reference voltage is inputted to the error amplifier, and
   the error amplifier includes an offset applying circuit having a resistor configured to apply an offset voltage to the feedback voltage and the reference voltage, and
   the error amplifier does not start outputting the amplified error voltage until the soft-start voltage increases to a predetermined value.

2. The switching power-supply circuit according to claim 1, wherein the soft-start voltage generator includes:
   a capacitor configured to be charged with an electric current, and to generate the soft-start voltage;
   a current source configured to supply the electric current to the capacitor; and
   a discharge transistor configured to discharge the capacitor in accordance with an external control signal.

3. The switching power-supply circuit according to claim 1, wherein the feedback signal is generated by dividing the predetermined output voltage.

4. The switching power-supply circuit according to claim 1, further comprising:
   an oscillator configured to output an oscillation signal that is a signal of a predetermined frequency; and
   a comparator configured to compare the amplified error signal with the oscillation signal,
   wherein the first and second drivers are controlled by an output signal from the comparator.

5. The switching power-supply circuit according to claim 4, wherein the oscillation signal is a triangular wave.

6. The switching power-supply circuit according to claim 4, wherein the output signal from the comparator is a pulse width modulation signal.

7. The switching power-supply circuit according to claim 1, further comprising a controller configured to permit, upon reception of an externally inputted signal for directing the controller to start operation, the second driver to turn on the second switching transistor after the first driver has turned on the first switching transistor at least one time.

8. The switching power-supply circuit according to claim 7, further comprising:
   an oscillator configured to output an oscillation signal that is a signal of a predetermined frequency; and
   a comparator configured to compare the amplified error signal with the oscillation signal, wherein
   the first and second drivers are controlled by an output signal from the comparator, and
   the controller is connected between the comparator and the second driver.

9. The switching power-supply circuit according to claim 8, wherein the second driver includes a delay circuit.

10. A semiconductor integrated circuit that generates a predetermined output voltage by controlling a first switching transistor connected to a power supply and a second switching transistor connected between the first switching transistor and the ground, the semiconductor integrated circuit comprising:
    a first driver configured to drive the first switching transistor;
    a second driver configured to drive the second switching transistor;
    a reference voltage generator configured to generate a reference voltage;
    a soft-start voltage generator configured to generate a soft-start voltage that increases gradually after the time of start; and
    an error amplifier configured to amplify an error voltage between a feedback voltage based on the predetermined output voltage and the soft-start voltage, and to control the first and second drivers in accordance with an amplified error voltage,
    wherein the reference voltage is inputted to the error amplifier, and
    the error amplifier includes an offset applying circuit having a resistor configured to apply an offset voltage to the feedback voltage and the reference voltage, and
    the error amplifier does not start outputting the amplified error voltage until the soft-start voltage increases to a predetermined value.

11. The semiconductor integrated circuit according to claim 10, further comprising a controller, configured to permit, upon receipt of an externally inputted signal for directing the controller to start operation, the second driver to turn on the second switching transistor after the first driver has turned on the first switching transistor at least one time.

12. The semiconductor integrated circuit according to claim 10, further comprising a soft-start terminal supplied with an input of the soft-start voltage, wherein
    the soft-start terminal is connected to a capacitor, and
    the capacitor is configured to be charged with an electric current, and to generate the soft-start voltage.

13. A switching power-supply circuit that generates a predetermined output voltage by controlling a first switching transistor connected to a power supply and a second switching transistor connected between the first switching transistor and the ground, comprising:
    a first driver configured to drive the first switching transistor;
    a second driver configured to drive the second switching transistor; and
    a controller, configured to permit, upon receipt of an externally inputted signal for directing the controller to start operation, the second driver to turn on the second switching transistor after the first driver has turned on the first switching transistor at least one time;
    wherein the controller comprises:
    a latch circuit configured to receive a signal inputted to the first driver and a start signal for starting an operation of the switching power-supply circuit; and
    a logic circuit configured to output a high level signal when an output signal of the latch circuit and the signal inputted to the first driver are high levels;
    wherein the second driver includes a delay circuit configured to delay a signal inputted form the controller.

* * * * *